UNITED STATES PATENT OFFICE.

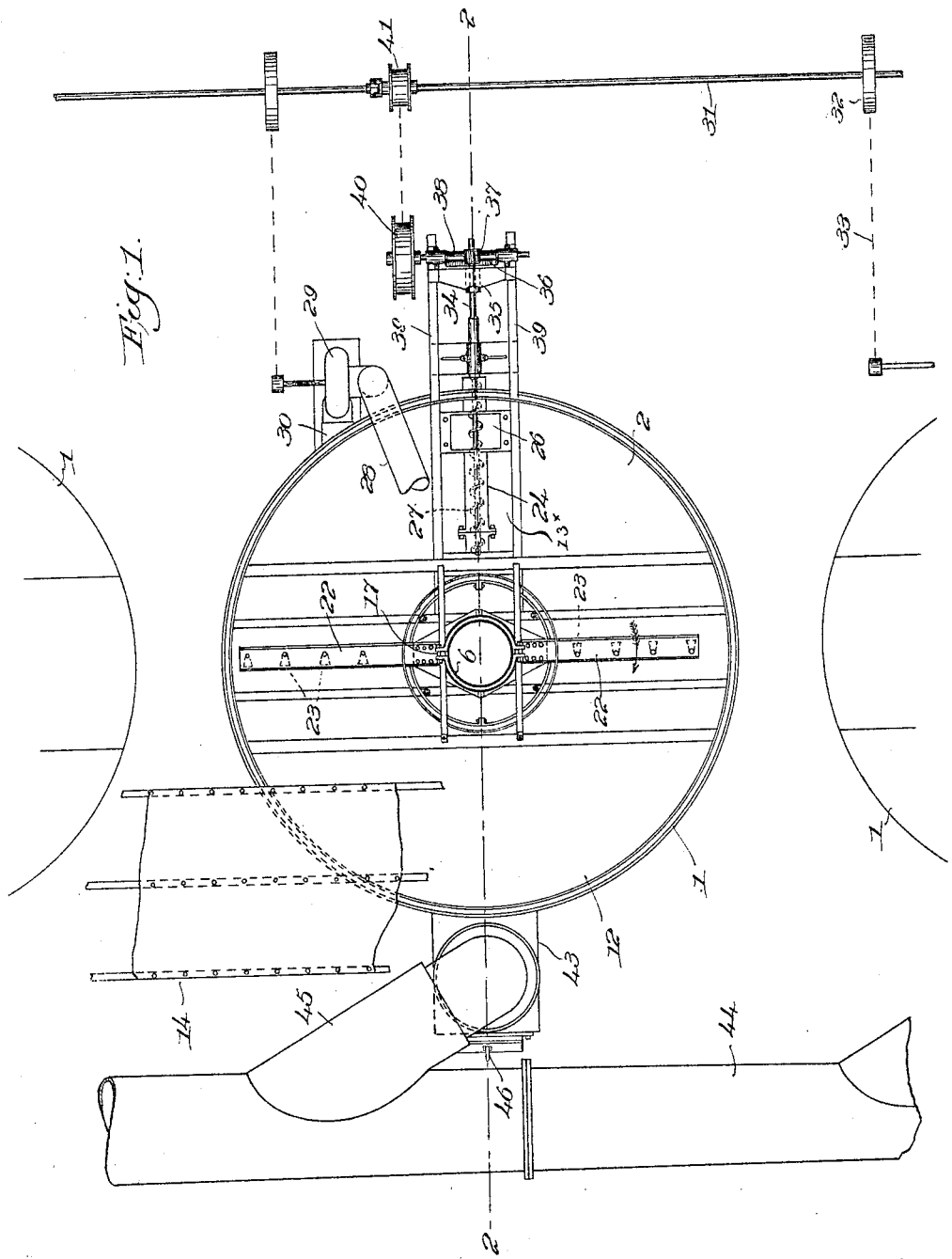

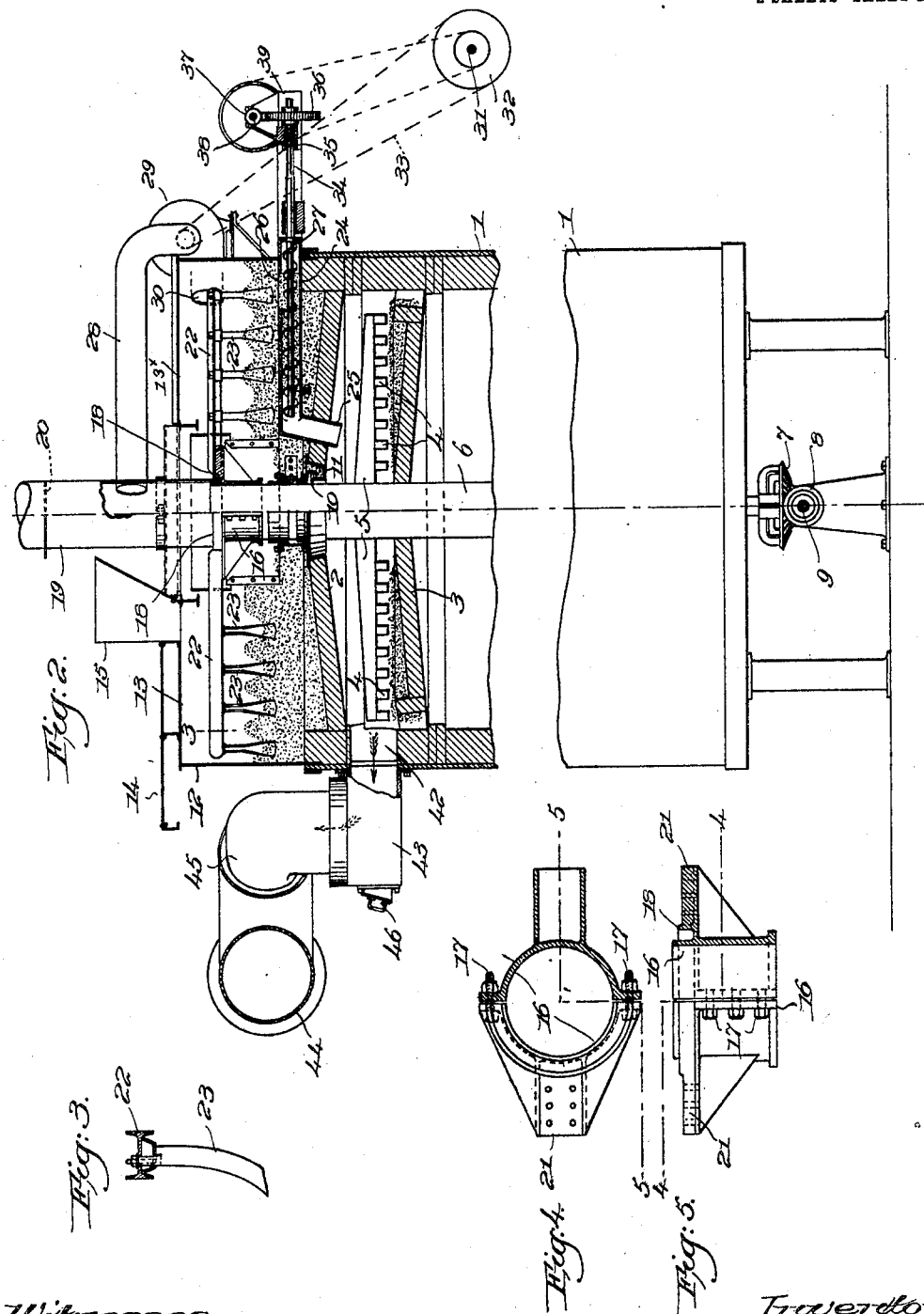

HENRY HOWARD, OF BROOKLINE, MASSACHUSETTS, ASSIGNOR TO MERRIMAC CHEMICAL COMPANY, OF NORTH WOBURN, MASSACHUSETTS, A CORPORATION OF MASSACHUSETTS.

MECHANICAL ROASTING OR DESULFURIZING FURNACE.

No. 804,227.  Specification of Letters Patent.  Patented Nov. 14, 1905.

Application filed April 11, 1905. Serial No. 255,065.

*To all whom it may concern:*

Be it known that I, HENRY HOWARD, a citizen of the United States, and a resident of Brookline, county of Norfolk, State of Massachusetts, have invented an Improvement in Mechanical Roasting or Desulfurizing Furnaces, of which the following description, in connection with the accompanying drawings, is a specification, like figures on the drawings representing like parts.

This invention relates to roasting or desulfurizing furnaces of the type wherein the ore or other material to be treated is supported within the furnace on shelves or floors arranged one above the other, the material being fed into the furnace at the top and being agitated or turned over on the different shelves by suitable stirrers and passing downward from shelf to shelf through the furnace.

In the well-known Herreshoff roasting-furnace, one form of which is shown in United States Patent No. 616,926, dated January 3, 1899, the furnace is provided with an upright rotatable hollow-shaft having radially extended stirrer-arms which carry teeth or plows which stir up and turn over the material on the different shelves. The rotatable shaft is made hollow to permit the passage therethrough of an air-current to keep down as much as possible the temperature of the connections between the shaft and the stirrer-arms, the hot air escaping from the upper end of the shaft. In such furnace the material is fed onto the topmost shelf, and it is gradually burned as it passes downward from shelf to shelf in well-known manner. Such furnaces are very successful in treating dry ore or other material, such as American pyrites, which can be stirred up during the roasting process without sticking or conglomerating in large masses. When treating material containing considerable moisture—such, for instance, as what are technically termed "washed Spanish fines"—these furnaces are not efficient unless the material is dried prior to its introduction to the furnace, thereby involving additional labor and expense and a large expenditure of time. If such material is introduced to the furnace without such prior drying, it blocks the feed and cakes and balls up in such large masses that the stirrers cannot break it up, and the stirrers themselves are often broken.

In my present invention I have utilized a large proportion of the waste heat of the furnace to dry the incoming material, the arrangement being such that the material is dried and stirred on the top or arch of the furnace and is fed therefrom to the interior of the furnace to be roasted. I have also provided a large storage for ore, which is available in keeping the feed mechanism supplied with ore for twelve hours or more without replenishing the ore so stored, amounting in practice to several tons. I have also provided means to catch or trap a large proportion of the dust which escapes with the burner gas or fumes, thereby insuring a very pure gaseous product from the furnace. I have also made an improvement in the feed mechanism whereby the same is very accessible and can be readily repaired or replaced in case of accident.

The various novel features of my invention will be fully described in the subjoined specification and particularly pointed out in the following claims.

Figure 1 is a top plan view of a sufficient portion of a desulfurizing plant to be understood with one embodiment of my invention applied thereto, the top or cover of the central furnace being removed to show the parts beneath. Fig. 2 is a partial vertical section on the line 2 2, Fig. 1, taken through the vertical center of the furnace, the latter being broken out between its top and bottom to economize space, the lower portion being shown in elevation. Fig. 3 is an enlarged detail taken on the line 3 3, Fig. 2, of one of the stirrers shown in the upper part of Fig. 2. Fig. 4 is a plan view and part section, enlarged, of the connection between the rotating tubular shaft of the furnace and the auxiliary or feed stirrer-arms, taken on the line 4 4, Fig. 5; and Fig. 5 is a side elevation and part section of such connection on the line 5 5, Fig. 4.

In the drawings, having more particular reference to Fig. 2, the upright circular furnace 1, having a top arch 2 and a plurality of shelves 3 arranged one above the other (one of such shelves being shown) to receive the material to be treated, said material being agitated and passed from shelf to shelf by stirrers 4, depending from radial revolving stirrer-arms 5, the upright tubular air-shaft 6, extended upward through the center of the furnace and to which the stirrer-arms are attached, and the gearing 7 8, connecting the lower end of the shaft 6 with a power-driven shaft 9 to rotate said tubular shaft, and thereby actuate the stirring devices, may be and are all substantially as usual in furnaces of the type hereinbefore referred to and illustrated in the Herreshoff patent. A depending annular flange 10, secured to the shaft 6, enters an annular concentric gutter 11, secured to the top arch 2, forming a species of sealing device to prevent the escape of the hot gases liberated by the roasting action in the furnace in substantially usual manner.

In accordance with my present invention I erect upon the furnace a drying-chamber 12, conveniently made of sheet metal and preferably having a cover 13, a runway 14, carried on the covers of the several furnaces extending the length of the group, the runway being partly shown in Fig. 1. A hopper 15, Fig. 1, opens into the chamber adjacent the runway, the material to be treated being brought up in suitable barrows or cars on the runway and dumped into the hoppers, passing thence into the drying-chambers, the bottom of each chamber being formed by the top arch 2 of its furnace. The upper end of the rotatable shaft 6 passes up through the chamber to a point near its cover 13, (see Fig. 2,) and a split collar 16 (see Figs. 4 and 5) is clamped rigidly upon the shaft by bolts 17, the collar having an annular upturned flange 18 surrounding its upper end. Into the groove formed by the collar and the flange is inserted the lower end of a stack 19, suitably bolted to the cover of the chamber and extending a suitable height above it, a damper 20 being arranged in the stack for a purpose to be described. Each half of the collar has a radially-extended seat 21, in which is bolted a stirrer-arm 22, and to each of the arms is securely bolted a series of depending stirrers or plows 23, one of which is shown separately in Fig. 3. The stirrers are curved in the direction of their length and made slightly scoop like to better break up and turn over the material in the chamber, the stirrers on one arm being so spaced as to track between the paths of the stirrers on the other arm, and the two sets of stirrers are faced to act in the same direction.

As the material is dumped into the chamber the rotation of the shaft 6 causes the stirrers to agitate and distribute the material, at first forming a bed upon the highly-heated arch, so that this bed of ore or other material quickly becomes dry and hot, so that the incoming material contacts therewith, and as it is spread and distributed by the stirrers it in turn becomes dry and hot.

A feed duct or tube 24 is led into the drying-chamber from its side wall radially toward the tubular shaft, the inner end of the duct being downturned at 25, Fig. 2, into the upper portion of the furnace through an opening in the top arch made for the purpose and fitting tightly into such opening. The feed-duct lies just below the paths of the lower ends of the stirrers, and it is provided with an inlet 26 in its top near the wall of the chamber, the hopper 15 and inlet 26 being located far apart, as shown in Fig. 2.

As the dried hot material is spread out in the chamber it is gradually worked over to the inlet and passes therethrough into the duct, in which it is positively pushed forward and forced into the furnace by a feed-screw 27 of well-known construction.

The material is so thoroughly heated and dried in the drying-chamber that it cannot cake or collect in large lumps and it is readily fed in dry and broken-up condition into the furnace onto the topmost one of the shelves 3 to begin burning. A great deal of the waste heat at the top arch of the furnace is thus utilized by the drying-chamber; but in order to still further increase the heating effect I provide means to introduce to the chamber more or less of the very hot air rising through the shaft 6. To this end the inlet 28 of a suitable blast fan or blower in the casing 29 is connected with the stack 19 below the damper 20, and the outlet 30 of the blower is introduced into the chamber through its side wall above the material therein, so that by closing the damper a hot blast of air will be directed through the chamber across the incoming material.

By properly manipulating the damper the amount of hot air can be regulated as desired, this hot air passing up through the shaft 6 being utilized to perform useful work instead of permitting it to go to waste, as is now customary.

By the construction described I am able to feed finely-divided ore or pyrites and washed Spanish fines containing a large percentage of moisture directly to the furnace without any previous drying operation, thereby not only greatly facilitating the treatment of such material, but also greatly reducing the cost of treatment thereof.

A driving-shaft 31 is extended along the row of furnaces and is provided with pulleys 32, which are connected by belts or chains 33 with the several blowers to actuate the same, and the same shaft is utilized to operate the feed-screws 27. For this purpose each screw-shaft 34 is extended a considerable distance beyond the outer end of the feed-duct and supported in bearings 35, and a worm-gear 36 on the shaft is caused to mesh with a worm 37 on a short transverse shaft 38, (see Fig. 1,) supported in bearings on struts 39. A pulley 40 on each shaft 38 is belted to a pulley 41 on the common actuating-shaft 31, by which means the several feed-screws are positively driven, and I prefer to use expansion-pulleys of any suitable construction, so that the speed of the feed-screws may be conveniently adjusted and varied as desired.

The means for driving the feed-screws is so arranged that in case of breakage of any of the parts repairs can be rapidly executed, obviating cooling down of the furnace and consequent loss of production.

The hot burner-gas is discharged through an opening 42, Fig. 2, in the side wall of the furnace near the top arch, and a great deal of dust and other impurities are apt to pass out with the gas. To arrest such dust, and thereby greatly increase the purity of the gas, I have provided a dust-arrester (shown as an elongated box 43) extended radially from the furnace and with the inner end of which box the opening 42 registers.

The main outlet-flue 44 for the gases from the several furnaces of the battery is connected with each box 43 by a pipe 45, which leads from the top of the box in an upright direction and then bends and passes in a horizontal direction to the flue 44.

As the hot gases rush out of the furnace into the box the heavier particles of dust impinge against the outer end of the box and fall to the bottom, while the lighter gas thus freed from the dust passes upward out of the top of the box into the pipe 45 to the outlet-flue in a much purified condition. A cover or door 46 at the outer end of the box enables the solid contents thereof to be cleaned out from time to time without materially disturbing the operation of the furnace.

The drying-chamber forms a storage-receptacle for a large quantity of ore, (in actual practice two tons or more,) so that sufficient dry material is provided for the feed mechanism without replenishing the chamber for ten or twelve hours.

The cover of the chamber is left open above the feed mechanism, as at 13$^x$, so that the action of the stirrers may be observed from time to time, and also permitting the escape of the hot air from the chamber.

So far as I am aware it is broadly new to utilize a large proportion of the waste heat of furnaces of this type to effect a preliminary heating and drying of the material before it is introduced into the interior of the furnace, and accordingly my invention is not restricted to the precise construction and arrangement herein shown and described, as various changes and modifications may be made by those skilled in the art without departing from the spirit and scope of my invention.

Having described my invention, what I claim as new, and desire to secure by Letters Patent, is—

1. In a furnace of the class described, a drying-chamber mounted thereon to receive and dry the material to be treated, manually-controlled means to directly introduce waste heat from the furnace into the drying-chamber and subject the contents thereof to the action of such heat, an agitating device within the chamber, and means to positively feed the dried material from the chamber into the interior of the furnace.

2. In a furnace of the class described, an upright, rotatable, tubular air-shaft extended through the top arch, a partially-closed drying-chamber on the arch to receive the material to be treated, means to introduce hot air from the shaft to said chamber, to dry the contents thereof, means to agitate and distribute the material introduced into the chamber, and a device to positively feed the dried material to the interior of the furnace.

3. In a furnace of the class described, a rotatable, tubular air-shaft having attached stirrer-arms, a partially-closed drying-chamber on the top arch of the furnace, to receive and dry the material to be treated, means to introduce hot air from said shaft into the chamber, a feed-duct adjacent the bottom of the chamber and opening into the interior of the furnace, and a device to positively force the dried material through the said duct into the furnace.

4. In a furnace of the class described, a central tubular air-shaft having attached stirrer-arms, a partially-closed drying-chamber superposed upon the top arch of the furnace, to receive the material to be treated, stirrers carried by the shaft to agitate and spread the incoming material in said chamber, a feed-duct within the latter below the paths of the stirrers and opening into the furnace, a feed-screw in the duct to positively force the dried material from the chamber into the furnace, a deep bed of hot material being maintained upon the top arch, and means to introduce into the drying-chamber the hot air from the tubular shaft.

5. In a furnace of the class described, a drying-chamber upon the top arch thereof, to receive the material to be treated, a tubular, rotatable shaft extended up through the furnace and said chamber, stirring means within the chamber and carried by the shaft, means to convey the hot air from the upper end of the shaft into the chamber, to dry the contents thereof, the chamber having an outlet for the heated air, and positively-acting feeding means within the chamber to force the dried material therefrom into the furnace.

6. In a mechanical roasting-furnace of the class described, a closed drying-chamber superposed upon the top arch thereof, to receive the material to be treated, an upright, central, tubular rotatable shaft extended through the furnace and chamber, a stationary stack communicating with the upper end of the shaft, means to conduct the hot air from the stack and force it into the chamber through its side wall, a coupling on the shaft within the chamber, radial arms attached thereto and carrying depending stirrers to agitate and distribute the incoming material, a feed-duct in the chamber below the paths of movement of said stirrers and opening into the furnace through the top arch, and a feed-screw in said duct to positively force the dried material from the chamber into the furnace.

7. In a mechanical roasting-furnace of the class described, a closed drying-chamber superposed upon the top arch thereof, to receive the material to be treated, an upright, rotatable air-conducting shaft extended through the furnace and chamber, means to force hot air from said shaft into the chamber, to dry the contents thereof, a feed-duct near the bottom of the chamber and opening into the furnace through the top arch, a positively-driven feed-screw in the duct to force the dried material through the duct into the furnace, and means within the chamber to stir the material and conduct it to the entrance of the feed-duct.

In testimony whereof I have signed my name to this specification in the presence of two subscribing witnesses.

HENRY HOWARD.

Witnesses:
JOHN C. EDWARDS,
ELIZABETH R. MORRISON.